United States Patent
Weiberle et al.

(10) Patent No.: US 6,539,297 B2
(45) Date of Patent: Mar. 25, 2003

(54) METHOD AND DEVICE FOR EVALUATING A SENSOR SIGNAL

(75) Inventors: Reinhard Weiberle, Vaihingen/enz (DE); Matthias Schanzenbach, Eberstadt (DE); Dieter Blattert, Kircheim/neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/900,556

(22) Filed: Jul. 6, 2001

(65) Prior Publication Data

US 2002/0072836 A1 Jun. 13, 2002

(30) Foreign Application Priority Data

Jul. 8, 2000 (DE) .......................... 100 33 344

(51) Int. Cl.$^7$ ................ G06F 7/00; B60T 8/66

(52) U.S. Cl. ................ 701/34; 701/70; 303/166
(58) Field of Search ............... 701/34, 70, 84, 701/83; 303/1, 166

(56) References Cited

U.S. PATENT DOCUMENTS 6,238,011 B1 * 5/2001 Keckmann .............. 303/20

FOREIGN PATENT DOCUMENTS

DE          198 26 053          12/1999

* cited by examiner

Primary Examiner—Yonel Beaulieu
(74) Attorney, Agent, or Firm—Kenyon & Kenyon

(57) ABSTRACT

A method and a device for evaluating a sensor signal. A value for the residual braking torque of the brake and/or a detection of a blockage of the wheel brake is derived as a function of this signal in the unbraked state.

17 Claims, 2 Drawing Sheets

METHOD AND DEVICE FOR EVALUATING A SENSOR SIGNAL

BACKGROUND INFORMATION

In conjunction with the control of a wheel brake, it is important to know when and/or whether the brake linings of the brake disc or brake drum lift up or have lifted up. This information is the basis for setting a defined air clearance on the wheel brake and contributes to the safety and availability of the wheel brake. Using a disc brake as an example, for correct ventilation of the wheel brake when the brake pedal is not activated, the brake piston as well as the floating caliper must lift a few tenths of a millimeter from the brake disc. For this purpose, the piston sealing rings, which ensure the return of the brake piston, as well as the guides of the floating caliper must be completely functional. However, the floating caliper tends to block as age and soiling increase as well as due to asymmetrical distribution of mass that may be present in newer brake systems such as, for example, a wheel brake with electromotive braking. The blockage by the floating caliper exerts a residual force on the brake disc via the lining on the outer side of the brake that is supported by the guide pins of the floating caliper. A constant one-sided heating of the brake disc and the brake lining causes, in extreme cases, the brake disc to warp due to the continuous stress, and the fading reserves can be quickly exhausted in a subsequent braking due to the high initial temperature. Furthermore, wear of the brake lining increases disproportionately, so that new linings must be prematurely installed. This residual force or residual braking torque cannot be decreased using control. Similar problems occur in other types of brakes as well, such that there is a need for having the above-mentioned information for these brake types as well. On the other hand, the sensors used for measuring the braking torque display drifting phenomena, so that it is not possible to determine using the sensor signal alone whether and when the brake linings lift or have lifted from the brake disc or brake drum.

A method is described in German Patent Application No. 198 26 053, with the aid of which the offset of a braking torque sensor can be detected. In addition to the braking torque, a quantity for the value (path) covered by the brake lining and the tendency of the braking torque to change along the path are calculated. If the torque no longer changes substantially along the path, the lining is assumed to have lifted. The air clearance is adjusted based on this zero point. Whether and when actual ventilation of the wheel brake has occurred is not determined.

SUMMARY OF THE INVENTION

By determining a residual braking torque, an increase in the driving safety of the vehicle is achieved because damage, in particular deformation, of the braking disc caused by one-sided heating, is effectively prevented and fading reserves are preserved. The driver is informed in a timely manner of the condition of the wheel brake and of increased wear on a brake lining and the brake disc, in particular in the case of floating caliper disc brakes.

It is especially advantageous that not only detection of a residual braking torque and recognition of a blocking wheel brake are performed, but also the offset of the sensor signal is detected in order to compensate for a drifting sensor offset.

Thus, the driving safety and availability of the wheel brake as well as the accuracy of the sensor signal are improved overall.

DETAILED DESCRIPTION

Figure 1:
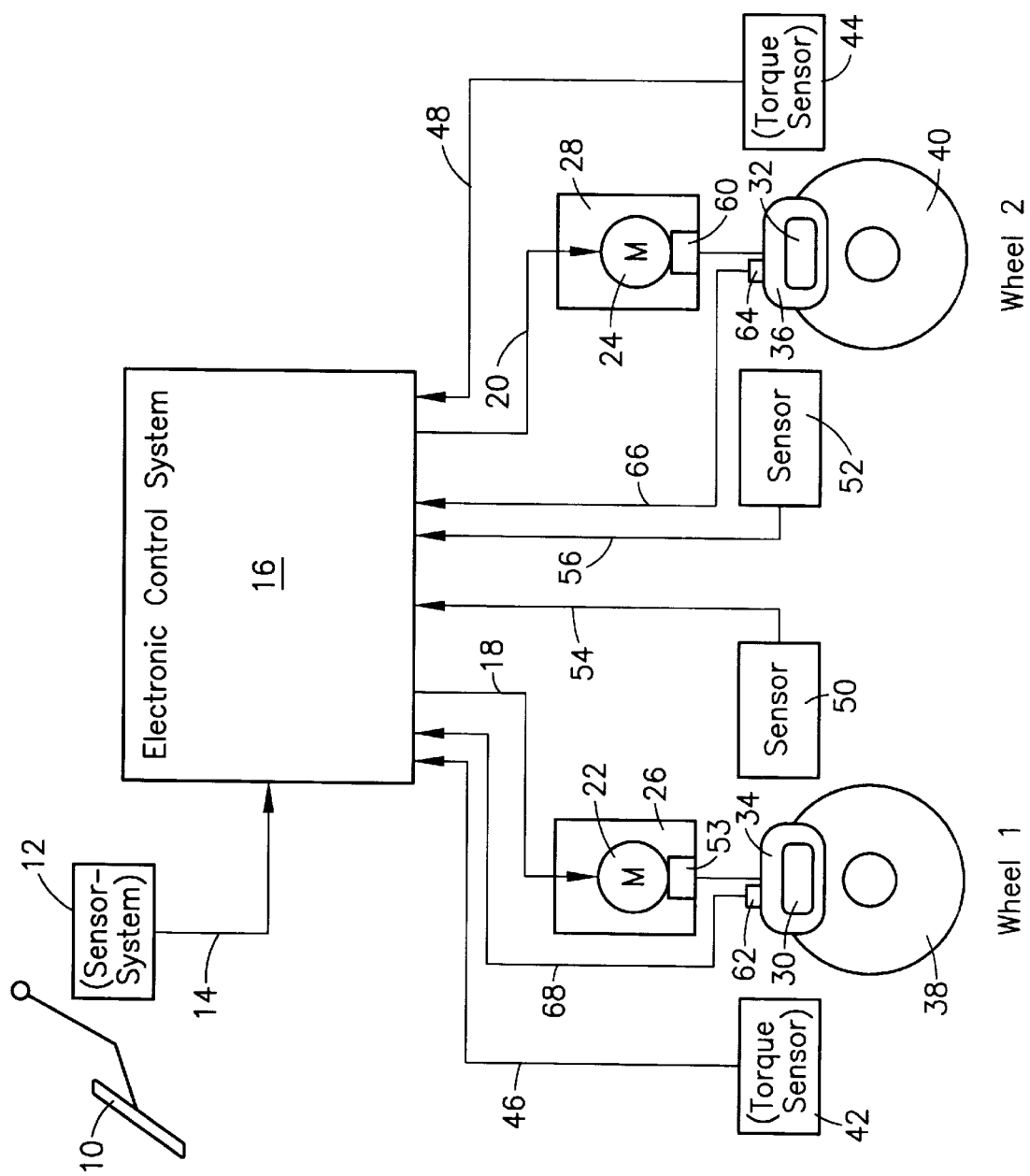
FIG. 1 shows an electrically controllable brake system in which the signal evaluation described below is used.

FIG. 1 shows an overview block diagram of a brake system having electromotive braking using the example of a wheel pair. This wheel pair could be assigned to an axle or a diagonal of the vehicle. The brake pedal of the vehicle is labeled 10. The driver's intention to brake is detected by sensor system 12 using angle, path, and/or force measurement and is supplied to an electronic control system 16 via line 14. This control system is constructed in an advantageous layout of a plurality of decentralized control units. The electronic control system activates electric motors 23 and 24 via output lines 18 and 20, for example, with a pulse width modulated voltage signal using an H-bridge output stage. In an advantageous exemplary embodiment, direct current commutator motors are used. The electric motors are a part of brake actuators 26 and 28. The rotary movements of these motors are transformed into translation movements in downstream gear stages 58 and 60, these movements resulting in displacements in brake linings 30 and 32. The brake linings are guided in calipers 34 and 36 and act on brake discs 38 and 40 of wheels 1 and 2. Furthermore, in a preferred exemplary embodiment, an electrically activatable spring force brake is assigned to each brake actuator, with the aid of which the brake actuator is locked in its instantaneous position so that the electric motor can be operated without electricity. The position of the brake actuator is then maintained without expenditure of energy.

Force or torque sensors 42 and 44 are used on each wheel; their signals are supplied to electronic control system 16 via measurement lines 46 and 48. In one variant embodiment, these sensors measure the axial supporting forces of the actuators during a braking sequence, thereby providing a measure of the normal forces acting on the brake discs. In another variant embodiment, the tangential supporting forces of the brake linings are measured and thus provide a measure of the frictional forces occurring in the brake discs and the respective frictional torques. In other exemplary embodiments, the braking torques are directly measured using a torque sensor. In one embodiment, this occurs directly on the wheel using tire sensors such as sidewall sensors or tire latch sensors or using sensors that are integrated in the wheel hub or in the wheel bearing. Additionally, the wheel speeds are detected by sensors 50 and 52 and are transmitted to control system 16 via input lines 54 and 56. Furthermore, angle sensors 62 and 64 are provided whose signals are transmitted to control system 16 via lines 66 and 68. In a preferred exemplary embodiment, these angle sensors are Hall effect sensors which, for example, record the rotation of the electric motor of the brake actuator and send several pulses per rotation, the number of which is a measure of the angle traveled and thus for the path traveled. In other exemplary embodiments, other sensors (for example, inductive sensors, potentiometers, etc.) are used for measuring paths or angles.

In electronic control system 16, target values for the individual wheel brakes or groups of wheel brakes are calculated from the detected intention to brake corresponding to preprogrammed characteristic maps. These target values correspond to the braking torques or braking forces to be applied on one wheel or one wheel pair, for example, whose magnitudes depend on the axle weight distribution of the vehicle, among other things. By comparing the calculated target values, which may be individual to each wheel, to the actual values of the braking torques or braking forces measured by sensors 42 and 44, error signals are calculated and transmitted to control algorithms, for example, in the form of discrete time PID controllers. The manipulating variable of these controllers is used for controlling the electric motors, with corresponding control signals being transmitted via lines 18 and 20. At the end of the braking sequence, the reference variables for the braking forces and braking torques to be set each become zero.

The sequence described in the following can not only be used in electromechanical brakes, but also in other electrically controllable wheel brakes that have hydraulic or pneumatic wheel brake actuators.

In one embodiment, the braking torque is measured and in others it is calculated on the basis of other values. Such calculations also represent sensors in the context of the description above and below.

If the brake is not ventilated correctly, a residual torque appears during driving, which is detected by a sensor. Such a residual torque results from mechanical blockage of the wheel brake or from a drifting offset of the sensor. In both cases, the residual torque cannot be decreased by actively withdrawing the brake piston. It is not possible to discern the cause based on the fact of an existing residual torque.

Such a discernment does not become possible until a transition from moving vehicle to stationary vehicle occurs. If the vehicle is standing on level ground, no braking torque is introduced into the vehicle wheel, not even when the brake, in particular the floating caliper, is not correctly ventilated. The output signal of the sensor is therefore accepted and read in as a new offset. If the wheel is changed from a stationary state to a moving state without activation of the brakes, a change in the braking torque signal results if the brake is not correctly ventilated. This signal change is used to detect the extent to which the wheel brake, in particular the floating caliper, is preventing a lining from being ventilated. The same is detected upon transition from a moving vehicle to a stationary vehicle when the vehicle or brake activation becomes stationary. Thus, the functional disturbance of the wheel brake (floating caliper brake) can be transmitted to the vehicle suspension link using a warning device.

If the vehicle is parked on a sloped stretch so that the brakes are not being actuated, but the vehicle is held on the slope by the incorrectly ventilated brakes, an incorrect offset is read in. In this operating state, the torque sensors detect an excitation even though a completely ventilated brake is assumed due to the stationary wheels and the non-actuated brake. The calculation of a mean value between multiple stationary positions results in the desired offset if it is assumed that the vehicle is parked without brake actuation on positive slopes just as often as on negative slopes. However, this method presupposes that the duration of the individual operating states is short with respect to the dynamics of the offset drift. Since this is often not actually the case, the residual braking torque is calculated using the blocked wheel brake in that the difference of the measured braking torques in braked and unbraked forward and reverse driving is calculated. The result describes the doubled residual braking torque. If the correct offset is to be calculated, it is determined from the sensor signal and the estimated residual braking torque as long as the vehicle is traveling and the conditions for offset compensation are present. These are present when no change in the measured braking torque results along the path traveled by a movable part of the wheel brake, for example, the path of a braking piston or a brake lining.

Figure 2:
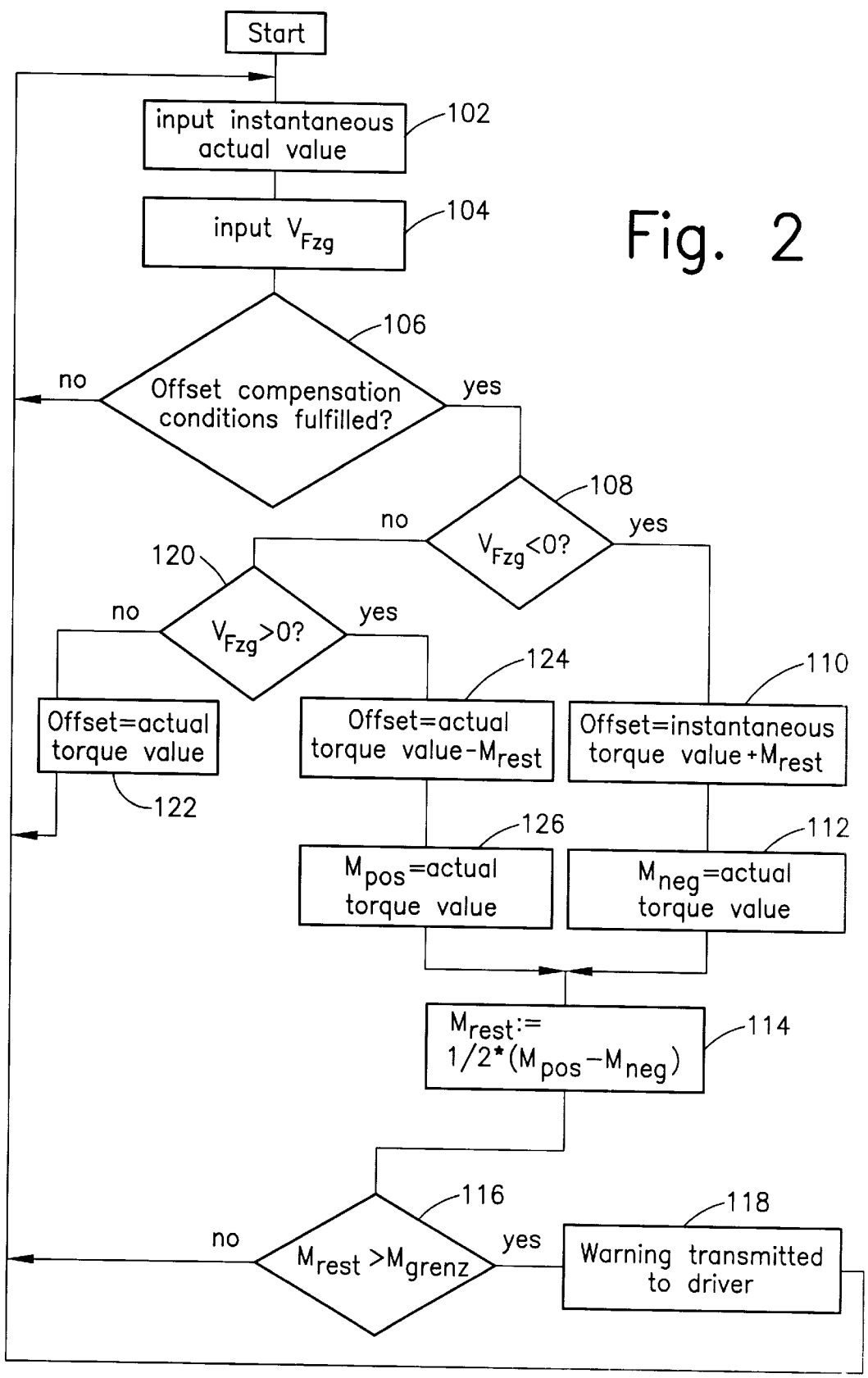
FIG. 2 shows an exemplary embodiment of the evaluation of a braking torque sensor signal using a flow chart.

In the preferred embodiment, the sequence described is embodied as a program of a computer in control unit 16. A preferred exemplary embodiment is shown in the flow chart of FIG. 2.

While the supply voltage is on, the program described above is run in predetermined time intervals. After the start of the program, the braking torque, which was measured on the wheel brake or wheel or using calculations, is input in a first step 102. In subsequent step 104, the vehicle speed VFzg is input, which was either measured or estimated based on the speed of at least one wheel. Query step 106 then determines whether the offset compensation conditions are fulfilled. If this is not the case, the program is repeated beginning with step 102. As described in the related art mentioned at the outset, the offset compensation conditions are that no change in the actual value of the braking torque occurs as compared to a measured displacement path of the wheel brake. If this condition is fulfilled, step 108 checks whether the vehicle speed is less than zero, i.e., whether the vehicle is moving backwards. If this is the case, the instantaneous actual value of the braking torque plus the residual braking torque value MREST, which is determined as explained below, is detected in step 110 as the offset value. In subsequent step 112, a negative braking torque value MNEG is set as the value of the detected actual value of the braking torque. Step 114 then determines the residual braking torque MREST as one-half of the difference between a positive braking torque MPOS and the negative braking torque MNEG. Here, the positive braking torque MPOS is determined as described below. Subsequent step 116 checks whether the residual torque value MREST is greater than the predetermined limit value MGRENZ. If this is not the case, the program is repeated beginning with step 102, otherwise the driver is informed of the blocking floating caliper according to step 118. After step 118, the program is repeated beginning with step 102.

If step 108 showed that the vehicle speed is not less than zero, step 120 checks whether the speed is greater than zero. If this is not the case, i.e., the speed is zero, the instantaneous actual torque value is saved as the offset value according to step 122. After step 122, the program is repeated beginning with step 102.

If step 120 showed that the speed is greater than zero, i.e., the vehicle is moving forward, the offset value is determined according to step 124 as the difference between the measured instantaneous torque value and the residual braking torque value MREST determined as described above. In subsequent step 126, the positive braking torque value MPOS used to determine the residual braking torque value is set as the new value of the actual torque. Step 114 follows after step 126.

Thus, a residual braking torque is determined according to the sequence described above depending on the output signals of the braking torque sensor during unbraked driving and changing driving direction, in particular on the basis of the deviation between the two values. Furthermore, a blocking wheel brake, especially a blocking floating caliper, is detected depending on the residual braking torque value detected. Another possibility for detecting a blocking brake is to examine the variation of the braking torque signal. If the sensor signal changes in the unbraked state when the vehicle has reached its stationary state or when driving is initiated suddenly from the stationary state, then such a blockage is present. This method is independent of the one described previously and can also be used instead of the previously described method.

Furthermore, in order to compensate for a drifting braking torque sensor, the offset value of the signal is determined when the offset compensation conditions are fulfilled. For this purpose, the estimated residual braking torque MREST is optionally subtracted from the measured braking torque when the compensation conditions are fulfilled so that a precise determination of the offset is possible even if a residual torque is present.

In other embodiments, instead of a braking torque value, signals are evaluated that represent the instantaneous brake power or braking work. Therefore, in the above and in the following, these physical quantities are also to be understood under the term braking torque.

In one exemplary embodiment, only offset determination is used, in another only blockage detection, in a third embodiment, the combination of these measures.

What is claimed is:

1. A method for evaluating a sensor signal which represents a braking torque applied to at least one wheel, as a function of which a wheel brake assigned to the at least one wheel is controlled, the method comprising the step of:

as a function of the sensor signal, performing at least one of the following:

determining a residual braking torque during unbraked driving; and detecting a mechanical blockage in an area of the wheel brake.

2. The method according to claim 1, wherein the residual braking torque is determined based on a detected braking torque during unbraked driving and during changing driving direction.

3. The method according to claim 1, wherein the residual braking torque is determined based on one of a deviation and a difference of braking torque values during unbraked driving with changing driving direction.

4. The method according to claim 1, further comprising the steps of:

specifying a limit value of the residual braking torque; and when the limit value is exceeded by the residual braking torque, sending a warning to a driver that indicates a blocking wheel brake.

5. The method according to claim 1, further comprising the steps of:

setting a torque value measured when a vehicle is stationary as a sensor offset value; and when the vehicle is in motion, deriving the offset value from the measured torque value and the residual torque determined during unbraked driving.

6. The method according to claim 5, further comprising the step of determining the offset value only when no change in braking torque has been detected along a path of the brake.

7. The method according to claim 1, further comprising the step of determining an offset value while a vehicle is in motion according to a measured braking torque value and a calculated residue torque value.

8. The method according to claim 1, wherein the blockage is detected based on a sudden change in a braking torque value in the case of an unbraked transition into one of a stationary state and a driving state.

9. A device for evaluating a sensor signal comprising:

a control unit for receiving a signal representing a braking torque on at least one wheel and for transmitting an output signal for controlling at least one wheel brake as a function of the braking torque signal; and means for performing, depending on the braking torque signal, at least one of (a) determining a residual braking torque during unbraked driving and (b) detecting a malfunction of the wheel brake.

10. The device according to claim 9, wherein the malfunction is a blockage.

11. The method according to claim 5, wherein the offset is derived from the measured torque value only if offset compensation conditions are fulfilled.

12. The method according to claim 11, wherein the offset compensation conditions are fulfilled if no change in the torque value results along a path traveled by a movable part of the wheel brake.

13. The method according to claim 12, wherein the path traveled includes one of a path of a braking piston and a path of a brake lining.

14. The method according to claim 11, wherein the offset is derived in accordance with a speed of the at least one wheel.

15. The method according to claim 14, wherein the offset is derived by adding the residual braking torque to the measured torque value, if the speed of the at least one wheel indicates that a vehicle is traveling backwards.

16. The method according to claim 14, wherein the offset is derived by subtracting the residual braking torque from the measured torque value, if the speed of the at least one wheel indicates that a vehicle is traveling forwards.

17. The method according to claim 11, wherein the residual braking torque is determined in accordance with the following equation: $M_{rest} = \frac{1}{2}*(M_{Pos}-M_{neg})$, in which Mrest is the residual braking torque, $M_{pos}$ is the measured torque value of the at least one wheel while a vehicle is traveling forward, and $M_{neg}$ is the measured torque value of the at least one wheel while the vehicle is traveling backwards.

* * * * *

UNITED STATES PATENT AND TRADEMARK OFFICE
CERTIFICATE OF CORRECTION

PATENT NO. : 6,539,297 B2
DATED : March 25, 2003
INVENTOR(S) : Weiberle et al.

It is certified that error appears in the above-identified patent and that said Letters Patent is hereby corrected as shown below:

Column 6,
Line 48, change "$M_{rest}32$" to -- $M_{rest}$ --.
Line 50, change "Mrest" to -- $M_{rest}$ --.

Signed and Sealed this

First Day of June, 2004

JON W. DUDAS
*Acting Director of the United States Patent and Trademark Office*